(12) United States Patent
Rajagopalan et al.

(10) Patent No.: US 8,792,497 B2
(45) Date of Patent: Jul. 29, 2014

(54) METHOD AND APPARATUS FOR PERFORMING LINK AGGREGATION

(75) Inventors: Balaji Rajagopalan, Sunnyvale, CA (US); Samer I. Nubani, Santa Clara, CA (US); Charles C. Park, Santa Clara, CA (US); Sirisha Paturi, Sunnyvale, CA (US)

(73) Assignee: Tellabs Operations, Inc., Naperville, IL (US)

( * ) Notice: Subject to any disclaimer, the term of this patent is extended or adjusted under 35 U.S.C. 154(b) by 327 days.

(21) Appl. No.: 11/605,829

(22) Filed: Nov. 29, 2006

(65) Prior Publication Data

US 2007/0280258 A1 Dec. 6, 2007

Related U.S. Application Data

(63) Continuation-in-part of application No. 11/447,692, filed on Jun. 5, 2006, now abandoned.

(51) Int. Cl.
*H04L 12/28* (2006.01)

(52) U.S. Cl.
USPC ........................................ 370/395.3; 370/422

(58) Field of Classification Search
None
See application file for complete search history.

(56) References Cited

U.S. PATENT DOCUMENTS

| | | | | |
|---|---|---|---|---|
| 5,222,085 A * | 6/1993 | Newman | ....................... | 370/422 |
| 5,600,641 A * | 2/1997 | Duault et al. | .................. | 370/400 |
| 5,617,413 A * | 4/1997 | Monacos | ....................... | 370/400 |
| 5,754,791 A * | 5/1998 | Dahlgren et al. | ............. | 709/242 |
| 5,917,819 A * | 6/1999 | Yang et al. | ..................... | 370/390 |
| 5,940,596 A * | 8/1999 | Rajan et al. | .................... | 709/242 |
| 6,363,077 B1 | 3/2002 | Wong et al. | | |
| 6,385,201 B1 | 5/2002 | Iwata | | |
| 6,535,489 B1 * | 3/2003 | Merchant et al. | ............. | 370/244 |
| 6,633,567 B1 * | 10/2003 | Brown | ....................... | 370/395.3 |
| 6,721,800 B1 * | 4/2004 | Basso et al. | .................... | 709/239 |
| 6,728,261 B1 * | 4/2004 | Sasson et al. | ................. | 370/466 |
| 6,763,394 B2 * | 7/2004 | Tuck et al. | ..................... | 709/238 |
| 6,765,866 B1 | 7/2004 | Wyatt | | |
| 6,922,410 B1 * | 7/2005 | O'Connell | ..................... | 370/401 |
| 6,952,401 B1 * | 10/2005 | Kadambi et al. | .............. | 370/232 |
| 7,016,352 B1 * | 3/2006 | Chow et al. | .................... | 370/392 |
| 7,050,430 B2 * | 5/2006 | Kalkunte et al. | ............... | 370/389 |
| 7,289,503 B1 * | 10/2007 | Sindhu et al. | ................. | 370/392 |
| 7,304,996 B1 * | 12/2007 | Swenson et al. | .............. | 370/394 |
| 7,327,748 B2 * | 2/2008 | Montalvo et al. | .............. | 370/412 |
| 7,403,484 B2 * | 7/2008 | Goodfellow et al. | ....... | 370/238.1 |
| 7,539,750 B1 * | 5/2009 | Parker et al. | ................... | 709/224 |
| 7,561,571 B1 * | 7/2009 | Lovett et al. | .................. | 370/392 |
| 7,602,712 B2 * | 10/2009 | Johnsen et al. | ............... | 370/231 |

(Continued)

*Primary Examiner* — Marsha D Banks Harold
*Assistant Examiner* — Hooman Houshmand
(74) *Attorney, Agent, or Firm* — Hamilton, Brook, Smith & Reynolds, P.C.

(57) ABSTRACT

A network node or corresponding method of performing link aggregation reduces a number of Content Addressable Memory (CAM) entries required to make a forwarding decision for a given ingress flow, reducing cost, size, and power consumption of the CAM and accompanying static RAM. In one embodiment, an ingress flow is mapped to an egress flow identifier. Subsequently, the egress flow identifier is mapped to a member of an aggregated group associated with an egress interface based on information available in a given ingress flow. Finally, the given ingress flow is forwarded to the member of the aggregated group associated with the egress interface. A hashing technique or two lookups may be used alone or in combination in mapping the ingress flow to the egress flow identifier to reduce CAM memory usage.

19 Claims, 11 Drawing Sheets

(56) References Cited

U.S. PATENT DOCUMENTS

| | | | |
|---|---|---|---|
| 7,633,955 B1* | 12/2009 | Saraiya et al. | 370/401 |
| 7,764,709 B2* | 7/2010 | Tran et al. | 370/469 |
| 8,085,779 B2* | 12/2011 | Parker | 370/392 |
| 2001/0037396 A1* | 11/2001 | Tallegas et al. | 709/230 |
| 2002/0012585 A1* | 1/2002 | Kalkunte et al. | 415/137 |
| 2002/0085578 A1* | 7/2002 | Dell et al. | 370/422 |
| 2003/0053474 A1* | 3/2003 | Tuck et al. | 370/422 |
| 2003/0147385 A1* | 8/2003 | Montalvo et al. | 370/389 |
| 2003/0223421 A1* | 12/2003 | Rich et al. | 370/389 |
| 2004/0004964 A1* | 1/2004 | Lakshmanamurthy et al. | 370/394 |
| 2004/0190512 A1* | 9/2004 | Schultz | 370/389 |
| 2004/0213275 A1* | 10/2004 | Basso et al. | 370/411 |
| 2005/0083935 A1* | 4/2005 | Kounavis et al. | 370/392 |
| 2005/0232274 A1* | 10/2005 | Kadambi et al. | 370/392 |
| 2006/0039384 A1* | 2/2006 | Dontu et al. | 370/400 |
| 2006/0221967 A1* | 10/2006 | Narayan et al. | 370/392 |
| 2008/0049774 A1* | 2/2008 | Swenson et al. | 370/412 |
| 2009/0285223 A1* | 11/2009 | Thomas | 370/400 |

\* cited by examiner

METHOD AND APPARATUS FOR PERFORMING LINK AGGREGATION

RELATED APPLICATIONS

This application is a continuation-in-part of U.S. application Ser. No. 11/447,692, filed Jun. 5, 2006, entitled "A Method and Apparatus for Performing Link Aggregation," now abandoned. The entire teachings of the above application are incorporated herein by reference.

BACKGROUND OF THE INVENTION

Link aggregation allows for the grouping of multiple physical links or ports within a network node into a single aggregated interface. Aggregated interfaces can be used for increasing bandwidth of an interface and for providing port level redundancy within an interface. An ingress interface on a line card residing in the network node receives flows including multiple packets and forwards these flows to port members of an aggregated group associated with an egress interface. Line cards may utilize Content Addressable Memory (CAM) to increase the speed of link aggregation and minimize the effects of search latency.

CAM, however, is expensive and, together with static RAM or other logic, consumes a significant amount of power and takes up board space. In addition, the number of entries in the CAM used for link aggregation greatly expands as the number of aggregated links increases. As a result, the CAM has a limited number of entries for performing other necessary and useful functions, including functions associated with a multi-service network node.

SUMMARY OF THE INVENTION

A network node or corresponding method in accordance with an embodiment of the present invention reduces a number of CAM entries required to perform link aggregation. In one embodiment, a first mapping unit maps a given ingress flow to an egress flow identifier. A second mapping unit, in turn, maps the egress flow identifier to a member of an aggregated group associated with an egress interface based on information available in the given ingress flow. A flow forwarding unit forwards the given ingress flow to the member of the aggregated group associated with the egress interface.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
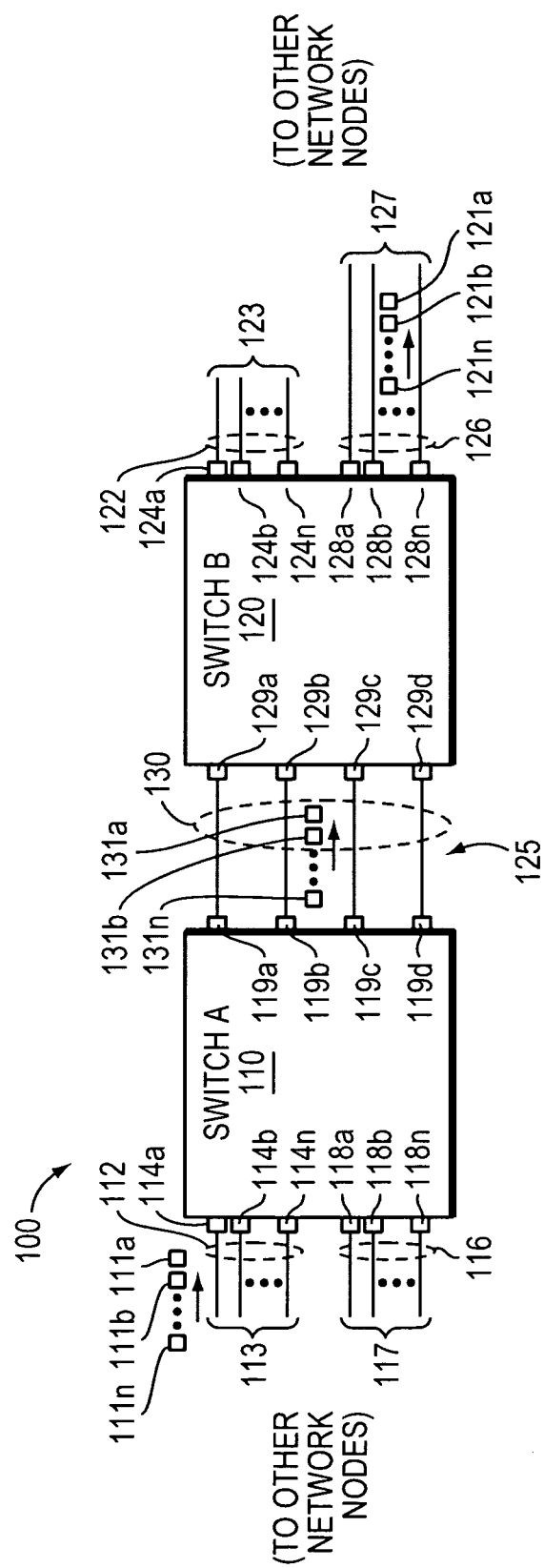
FIG. 1 is a network diagram of a portion of a communications network employing an embodiment of the present invention.
Figure 2:
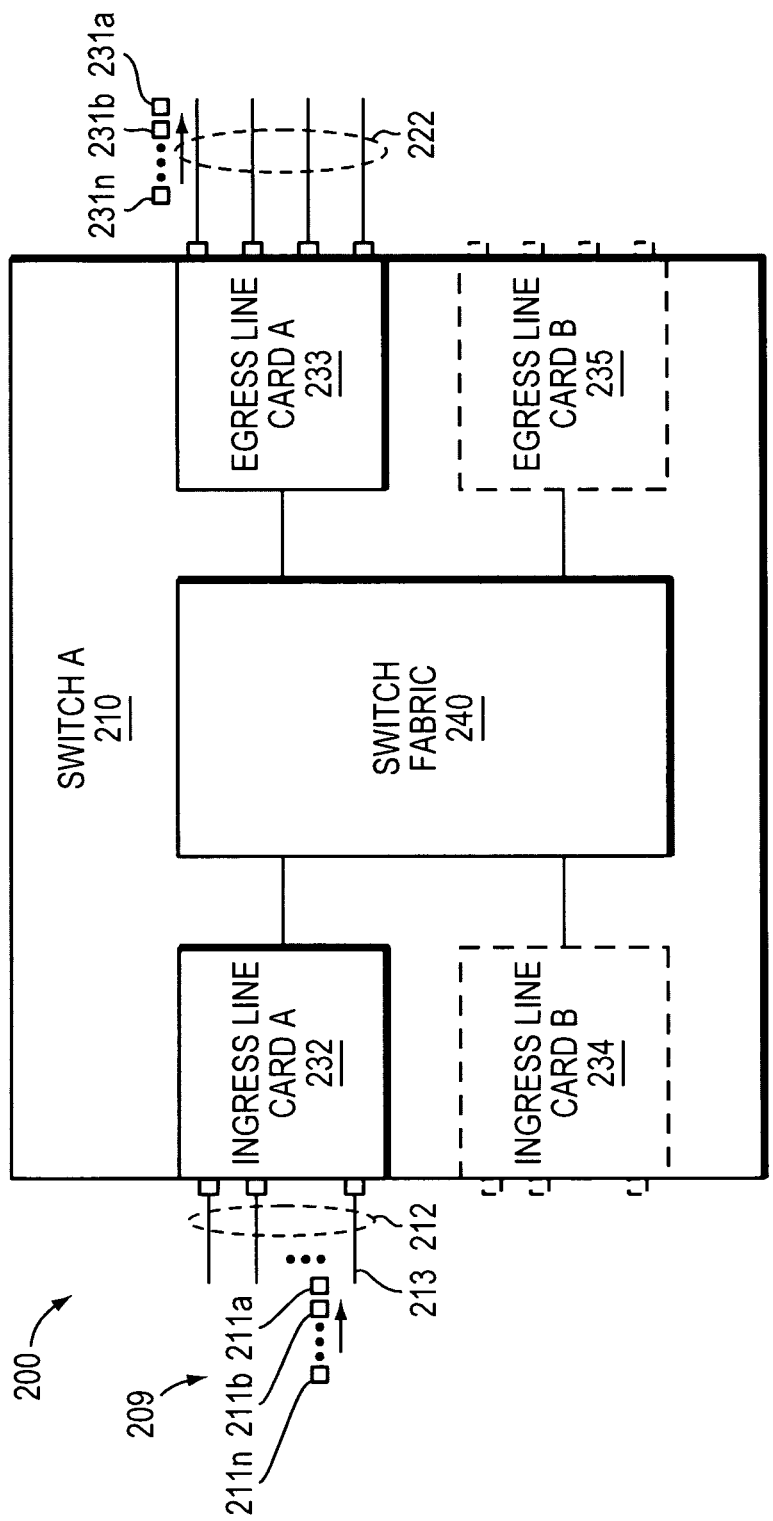
FIG. 2 is a block diagram of an example switch used in a communications network.

Typically, when a link aggregated interface of a multi-service switch receives a given flow, it searches a lookup table to determine a port member of an egress interface to which to forward the flow. The lookup table is often programmed into Content Addressable Memory (CAM) because of its speed and flexibility in supporting multiple services. In the case of layer 2 switched VLAN traffic, hundreds or thousands of VLANs may be associated with the link aggregated interface. As a result, the CAM may need tens of thousands of entries. FIG. 1 illustrates a network with switches that use link aggregation. FIG. 2 illustrates an example switch with line cards and a switch matrix supporting Layer 2 switching that may use CAM with a lookup table to support the switching. An example embodiment of the present invention illustrated in FIG. 3 reduces the number of CAM entries needed by executing a hashing algorithm on source and destination addresses of a packet in the given flow. Example embodiments of the present invention illustrated in FIGS. 4-11 further reduce the number of CAM entries needed by performing two different successive lookups. The tradeoff for reducing the number of CAM entries is increased latency because of the additional lookup. The latency, however, may be reduced by dividing the CAM into multiple cascaded CAMs and performing multiple lookups in parallel. For example, a CAM may be divided into four CAMs with each CAM dedicated to a portion of the VLANs supported by an ingress interface. FIGS. 1-11 are presented in detail below, in turn.

FIG. 1 is a network diagram of a portion of a communications network 100 employing an example embodiment of the present invention. This portion of the communications system 100 includes two switches 110, 120 (Switch A and Switch B). Switch A 110 may include any number of ingress ports 114a, 114b, ..., 114n (114a-n), 118a, 118b, ..., 118n (118a-n), and so forth, connected through physical links 113 and 117, respectively, to other network nodes (not shown). In accordance with a link aggregation technique, Switch A 110 may logically bond together groups of the physical links 113, 117, connected to respective groups of ingress ports 114a-n, 118a-n, into link aggregation groups (LAGs) 112, 116, respectively. In this way, the groups of physical links 113, 117 appear as one logical link. The link aggregation groups 112, 116 may be maintained according to a link aggregation configuration hierarchy that includes an aggregator (not shown) associated with each group of ingress ports 114a-n and 118a-n. A logical interface (not shown) can be built on the aggregator with the associated physical ports being part of the logical interface.

In an example embodiment, each link aggregation group 112, 116 has a uniquely assigned Media Access Control (MAC) address and an identifier. This MAC address can be assigned from the MAC address of one of the ports in a link aggregation group or from a pool of reserved MAC addresses not associated with any of the ports in the link aggregation group. The MAC address is used as a source address when transmitting and as a destination address when receiving.

Switch B 120 may similarly have any number of egress ports 124a, 124b, ..., 124n (124a-n), 128a, 128b, ..., 128n (128a-n), and so forth, connected through physical links 123, 127, respectively, to other network nodes (not shown). As with Switch A 110, Switch B 120 may logically bind together groups of the physical links 123, 127 connected to respective groups of egress ports 124a-n, 128a-n, into respective link aggregation groups 122, 126. Switch A 110 may also have egress ports 119a, 119b, 119c, and 119d connected through respective physical links 125 to ingress ports 129a, 129b, 129c, and 129d of Switch B 120. Both Switch A 110 and Switch B 120 may bind together the group of the physical links 125 connecting the two switches 110, 120 into a link aggregation group 130.

A given flow, including any number of packets 111a, 111b, ..., 111n (111a-n), may be transmitted from another network node to Switch A 110 via the physical link connected to ingress port 114a. The given flow may include multiple packets having the same source and destination addresses. Packets that are not members of the given flow may be interspersed among packets (e.g., packets 111a-n) that are members of the given flow.

Switch A 110 may transmit or forward the same or a different flow, including packets 131a, 131b, ..., 131n (131a-n), to Switch B 120 via at least one of the physical links 125 connecting Switch A's egress ports 119a-d to Switch B's ingress ports 129a-d. Switch B 120, in turn, may transmit the same or a different flow, including packets 121a, 121b, ..., 121n (121 a-n), to another network node via at least one of the physical links 127 connected to Switch B's egress ports, such as the lowermost port 128n, as illustrated. In this manner, flows are transmitted between nodes in the communications network 100 via a Label Switched Path (LSP) or other type of path, such as an Internet Protocol (IP) path.

The aggregator (not shown) may distribute received frames from a higher application to one of the links used by the aggregator. In addition, the aggregator may transmit received frames from one of the links on a link aggregation group to a higher layer application in the order that they are received.

The aggregator (not shown) may operate according to two modes: incremental bandwidth mode and link protection mode. In incremental bandwidth mode, a user can increase or decrease the bandwidth of interfaces built on an aggregator by adding or deleting members to or from the link aggregation group. For example, a user may wish to upgrade from a 100 Megabit fast Ethernet link without subscribing to a costly Gigabit fast Ethernet link. In incremental bandwidth mode, the user can take two 100 Megabit fast Ethernet links and bond them together using link aggregation to get effectively 200 Megabits of bandwidth.

In link protection mode, an "active" member is the only member within an aggregator that can transmit, while all members of the aggregator can receive. In link protection mode, the maximum bandwidth of an interface that is built on the aggregator is the bandwidth of a single member and not the sum of all the members as in incremental bandwidth mode. Thus, the other members are reserved for future use in case the "active" member goes down.

FIG. 2 is a block diagram of an example switch 200 (Switch A) used in a communications network. Switch A 210 may include multiple ingress line cards, such as ingress line cards A and B 232, 234, connected to multiple egress line cards, such as egress line cards A and B 233, 235, via a switch fabric 240. A flow 209, including any number of packets 211a, 211b, ..., 211n (211a-n), may be transmitted to Switch A 210 via a link member 213 of a link aggregation group 212 associated with ingress line card A 232. In other embodiments, the ingress interface may not be aggregated. The ingress line card A 232 determines the appropriate egress line card and egress line card port to forward the flow 209 and forwards the flow 209 via the switch fabric 240 to one of the egress line cards 233, 235. For example, a flow, including packets 231a, 231b, ..., 231n (211a-n) may be forwarded to a link of another link aggregation group 222.

Figure 3:
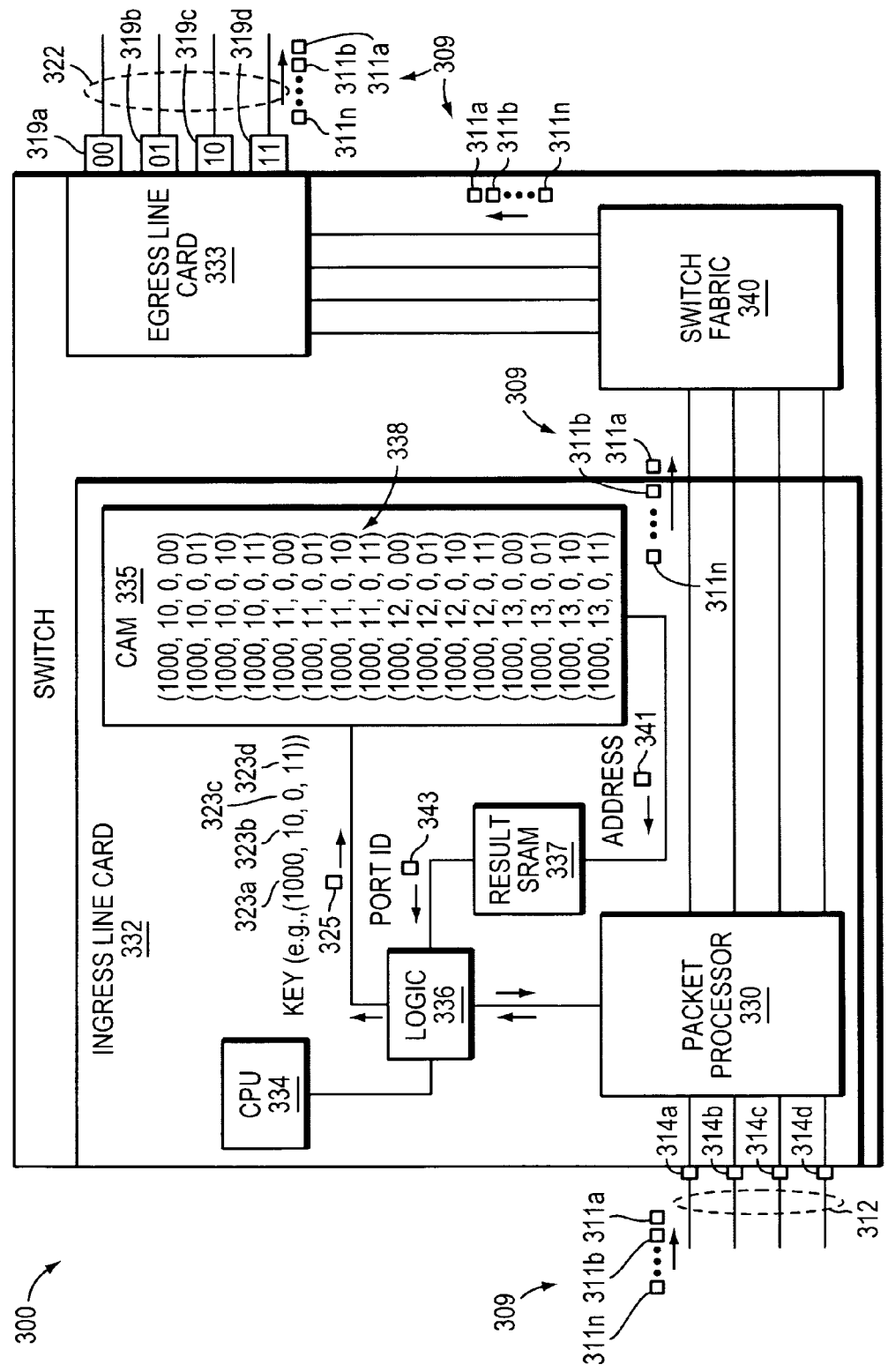
FIG. 3 is a block diagram of a switch that includes an ingress line card with example components.

FIG. 3 is a block diagram of a switch 300 that includes an ingress line card 332 illustrating example components of the ingress line card 332. The switch 300 also includes a switch fabric 340 and an egress line card 333. The ingress line card 332 includes a packet processor 330, logic 336, a central processing unit (CPU) 334, and Content Addressable Memory (CAM) 335. The packet processor 330 connects to the logic 336 via a bidirectional line 345. The logic 336 formats data from the result SRAM 337 in a way that the packet processor 334 understands, and the logic 336 formats data from the packet processor 334 in a way that the CAM 335 understands. The logic 336 connects to Content Addressable Memory (CAM) 335, and the CAM 335, in turn, connects to a result Static Random Access Memory (SRAM) 337. The result SRAM 337 then connects back to the logic 336. The logic 336 may be programmed into a Field Programmable Gate Array (FPGA). The packet processor 330, via the logic 334, may access information, such as keys 338 (shown as sets of numbers within brackets), that is organized and stored in the CAM 335.

In one example embodiment, the CAM 335 may have a maximum of 512,000 entries that are 72 bits wide or 256,000 entries that are 144 bits wide. Each CAM entry may have a corresponding SRAM entry. Thus, in this embodiment, the result SRAM 337 may have at least 512,000 or 256,000 entries if the CAM has 512,000 or 256,000 entries, respectively. The result SRAM 337 may have 192-bit-wide entries to accommodate other information besides an egress aggregate flow identifier and a flag.

The ingress line card 332 includes ingress ports 314a, 314b, 314c, and 314d (314a-d). The ingress line card 332 may bond together the ingress ports 314a-d into an ingress link aggregation group 312. The ingress line card 332 connects through the switch fabric 340 to the egress line card 333 having egress ports 319a, 319b, 319c, and 319d (319a-d). The egress line card 333 may also bond together the egress ports 319a-d into an egress link aggregation group 322. In other embodiments, any number of the ingress ports 314a-d and egress ports 319a-d may not be logically bound together into link aggregation groups, such as the ingress and egress link aggregation groups 312, 322.

A network operator may provision (or signal) the Ingress Line Card 332 with configuration settings using an embodiment of the present invention. For example, the network operator may enter configuration information for a customer using VLAN ID 10 on a given fast Ethernet interface via an operator interface. In this manner, the network operator builds a circuit on the fast Ethernet interface of VLAN ID 10. The CPU 335 may then program the CAM 335, the result SRAM, and the packet processor 334 via the logic 336. For example, the CPU 334 may execute a lower layer of software that programs the appropriate CAM entries (i.e., CAM keys and corresponding SRAM results) via the logic 336. If implemented in software, the software may be stored on any computer readable medium (e.g., a removable storage medium such as one or more DVD-ROM's CD-ROM's, diskettes, tapes, etc.), known or later developed in the art, having stored thereon sequences of instructions, the sequences of instructions including instructions, when executed by a digital processor that cause the processor to perform in manner as in embodiments of the present invention. The CPU 335 may also program the packet processor 334 with microcode instructions to analyze a given ingress flow and access information from the CAM 335 and result SRAM 337 in order to determine a link on which to forward a given ingress flow, The CPU 334 may further program the packet processor 330 with the encapsulation type of port 314a of the ingress interface. In this example embodiment, the encapsulation type is layer 2 switched VLAN traffic.

After the CPU 334 programs the CAM 335, result SRAM 337, and packet processor 330, the packet processor 330 (1) receives a flow 309, including multiple packets 311a, 311b, . . . , 311n, from one of the ingress ports 314a-n (in this example, port 314a) of the ingress line card 332, (2) builds a key 325 based on the contents of the flow 309, and (3) launches a CAM lookup with the key 325. The packet processor 330 executes these functions because it can do so at a significantly greater packet rate than a CPU (e.g., more than 50 million packets per second).

For a layer 2 switched Virtual Local Area Network (VLAN) key type, the key 325 may include four key parameters: an ingress interface identifier 323a, VLAN identifier 323b, three-bit priority 323c, and hash value 323d ({L2FlowId, VLAN, Priority, Hash}). The key 325 may include different key parameters for key types, such as Internet Protocol (IP), Ethernet, or other non-VLAN key types. When the packet processor 330 receives the flow 309 from the port 314a of the ingress link aggregation group 312, it populates the key's first entry 323a with the layer 2 flow identifier identifying the ingress interface (e.g., "1000"). The packet processor 330 then looks at the flow's Ethernet header (not shown) to make sure the packet headers are correct and to identify the flow's VLAN tag or identifier that identifies the VLAN with which the flow 309 is associated. The packet processor 330 looks-up the VLAN identifier to determine on which interface to send out the flow 309 and, optionally, swaps in a new VLAN identifier in place of the one the flow 309 had when the switch 310 received it.

The packet processor 330 also extracts the priority from a priority field, such as a three-bit priority field, in the VLAN header that is used to prioritize flows and to populate the priority key parameter field 323c with the priority (e.g., priority "0"). Finally, depending on the flow type, the packet processor 330 extracts the source and destination addresses from the flow's Ethernet headers and runs an algorithm on the source and destination addresses to calculate a hash value, such as a four-bit hash value. The packet processor 330 populates the hash key parameter field 323d with this hash value. The hash value indicates the specific egress port member of the egress link aggregation group 315 to forward the flow 309. Note that in a switch having an egress interface that is not link aggregated, the CAM keys may not include a hash field because there is no need for link aggregation.

Use of a hashing technique, such as the one described immediately above, decreases the size of a table (e.g., CAM and corresponding result SRAM) that must be indexed to determine the specific egress port member to which to forward a flow. For example, a 48-bit source MAC address requires a table having 248 entries. But, by using a hashing technique, that 48-bit source MAC address may be compressed to a smaller number, such as a 10-bit number. Hashing produces duplicates or "collisions." For example, subsets of 48-bit number variations compress to a same 10-bit number. Thus, a table may have multiple entries at a certain index that hash to the same value. As a result, hashing increases the efficiency of a lookup. In one embodiment, a hashing algorithm compresses a 48-bit source MAC address and a 48-bit destination MAC address to 4 bits. In other words, 96-bits of information are compressed to a 4-bit number. Thus, many combinations of source and destination MAC addresses can hash to the same 4-bit value. If there are a larger number of flows, there is a better chance of getting an equal distribution across all egress port members.

The hashing is typically random enough to provide some variance so that traffic is distributed evenly across the links. The hashing may be a CRC or an exclusive-or (XOR) type of operation. Hashing may also be performed on a per flow basis or on a per packet basis. With per-flow hashing, whether there are two flows or a thousand flows, if the flows originate from the same source MAC address destined to the same destination MAC address, they all hash to the same link because the same hashing operation is performed on each of the flows. Variance in the source and destination MAC addresses of the flows causes distribution flows across multiple links. For example, if several flows originate from the same source MAC address, but they are destined to different destination MAC addresses, there is a greater probability that some flows will hash to a first link and some flows will hash to a second link.

A hashing operation may also be performed on individual packets, which are distributed across different links based on the hashing, even if those packet are part of the same flow. However, individual packets may arrive at a receiving side out of order. As a result, the receiving side must put individual packets back in order. This involves a significant amount of overhead and some protocols cannot handle packets that arrive out of order. Therefore, a hashing algorithm may be run on a per flow basis, and the flows are distributed accordingly to ensure that packets associated with the same flow arrive in order.

In the example embodiment illustrated in FIG. 3, the two least significant bits of the four-bit hash value identify the egress port members (319a-d) of the egress link aggregation group 322. A hash value of "00" identifies egress port member 319a, a hash value of "01" identifies egress port member 319b, a hash value of "10" identifies egress port member 319c, and a hash value of "11" identifies egress port member 319d. In another embodiment, a four-bit hash value may be used that supports up to sixteen egress port members. Other numbers of bits used for hash values support other numbers of egress port members.

After the packet processor populates the key 325 with key parameters 323a-d, it launches a lookup with the key 325. Specifically, this lookup causes a search of keys 338 in the CAM 335 for a matching key. If there is a match, the CAM 335 returns an address 341 that indexes another lookup table 338 in the result SRAM 337 that has the CAM result, which may include the egress port member identifier 343. The address 341 may be an index or a pointer to some area in the result SRAM 337. The egress port member identifier 343 may include, for multiple egress line cards 333, a destination egress line card identifier and an output connection identifier (OCID). The contents of the result SRAM 337 indexed by the CAM result are then provided to the packet processor 330. The packet processor 330 then forwards the flow 309 to the appropriate egress port member (e.g., port member 319d identified by hash value "11") via switch fabric 340 based on the egress port member identifier 343.

In summary, in the above-described example embodiment of FIG. 3, flows (e.g., flow 309) from one VLAN identified by the number "10" (323b) may come into the packet processor 330 through an ingress port member (e.g., port member 314a) of the ingress link aggregation group 312. The egress link aggregation group 322 of the egress line card 333 may include only two active port members (e.g., port members 319a, 319b). In this instance, two CAM entries are used to allow incoming traffic flows to hash to the two port or link members 319a, 319b (e.g., {1000, 10, 0, x0} and {1000, 10, 0, x1}).

A given link can support multiple VLANs (i.e., "logical subinterfaces"). Thus, another VLAN (e.g., "11") on the same ingress interface (e.g., "1000" (323a)) associated with the ingress link aggregation group 312 may be forwarded to the same two port members 319a, 319b. In this case, another two CAM entries are used (e.g., {1000, 11, 0, x0} and {1000, 11, 0, x1}). If flows (e.g., flow 309) from four VLANs come into the packet processor 330 and the egress link aggregation group 322 includes four active port members 319a-d, sixteen CAM entries (338) are used for each of the VLANs identified by the numbers 10-13.

Thus, the number of CAM entries is equal to the number of VLANs a user desires to support multiplied by the number of aggregated egress links or port members of the egress link aggregation group 322. For large numbers of VLANs, many CAM entries are used. For example, the ingress line card 332 may support 4,000 VLANs, numbered 10 to 4009, and the egress line card 333 may include two aggregated egress links. In this case, 4,000×2=8,000 CAM entries that are used to service all possible combinations.

Figure 4:
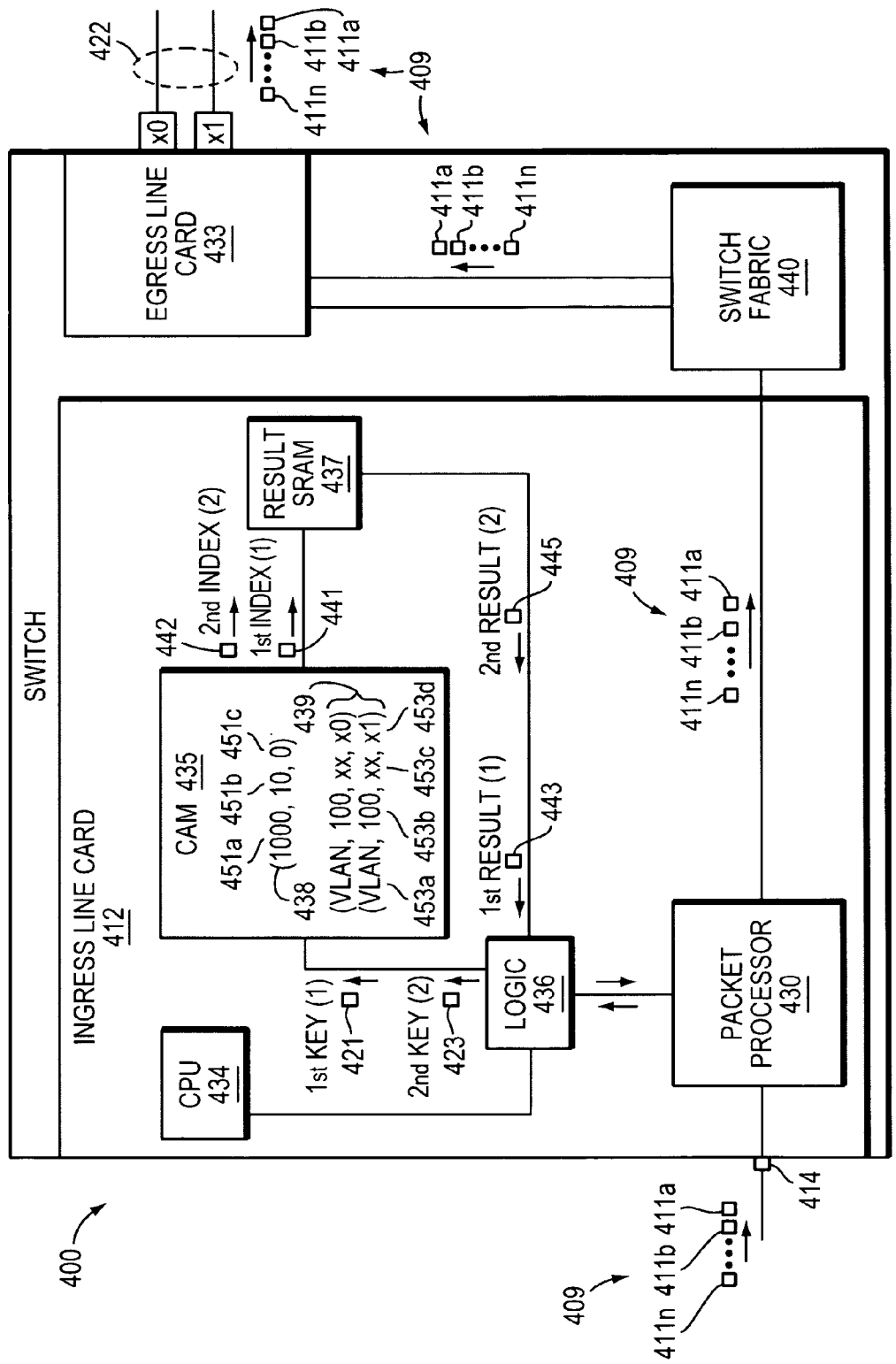
FIGS. 4-6 are block diagrams of a switch illustrating multiple operations of the example components in an ingress line card according to embodiments of the present invention.

FIG. 4 is a block diagram of a switch 400 illustrating example components in an ingress line card 412 according to an embodiment of the present invention. In particular, FIG. 4 illustrates a new manner in which to set up the CAM entries to provide packet or flow distribution across outgoing links, i.e., determine the outgoing links to direct flows, as a function of the incoming flow. Like the switch 310 in FIG. 3, a switch 410 includes an ingress line card 412, switch fabric 440, and an egress line card 433. The ingress line card 412 includes a packet processor 430, CPU 434, CAM 435, logic 436, and Result SRAM 437. The CAM may be a Ternary CAM (TCAM) that has three possible lookups or choices: a binary 0, binary 1, or "Don't Care" (i.e., either a binary 0 or binary 1).

The packet processor 430 receives a flow 409, including multiple packets 411a, 411b, ..., 411n, through an ingress port 414. The packet processor 430 then builds a first key 421 formatted to hit a CAM entry and launches a first CAM lookup. The first key 421 includes three key parameters. The first key parameter 451a is a layer 2 flow identifier, which identifies the interface from where the flow 409 originated. The second key parameter 451b is a VLAN identifier which the packet processor 430 extracts from the header of the packets 411a-n in the flow 409. The third key parameter 451c is a priority which the packet processor 430 also extracts from the header of the packets 411a-n in the flow 409. The first key 421, however, does not include a hash key parameter. Thus, the packet processor 430 does not extract source and destination addresses, such as a MAC or IP address, from the flow 409 and calculate a hash value when it builds the first key 421.

After the packet processor 430 builds the first key 421, it launches a first lookup by sending the first key 421 to the CAM 435. The CAM 435 searches a first lookup table 438 for a matching key and returns an address or first index 441 used to index the Result SRAM 437. The information contained in an entry of the Result SRAM located at the first index 441 may be a first result 443 that includes an "aggregated" bit or flag and the egress aggregate flow identifier. The "aggregated" bit indicates to the packet processor 430 that it should launch a second CAM lookup (also referred to as the "aggregated lookup") because the egress interface associated with the VLAN ingress flow is aggregated. The egress aggregate flow identifier, for example, may be an 18-bit number. The packet processor 430 then builds a second key 423 formatted to hit another CAM entry.

The second key 423 includes four key parameters. The first key parameter is the flow type key parameter 453a. The flow type key parameter 453a identifies what type of flow is being sent out on an aggregated interface, such as the egress line card 433. When the packet processor 430 builds the second key 423, it knows the flow type of the flow 409 from the first lookup. In one embodiment, the flow type key parameter 453a is used to distinguish between different forwarded flows that are traversing the same egress aggregated interface. For example, if layer 2 traffic and IP traffic are both traversing the same Resource Reservation Protocol (RSVP) Label-Switched Path (LSP), then the flow type key parameter 453a is used to distinguish the layer 2 flow from the IP flow. The ingress line card 412 and the egress line card 433 may receive and send, respectively, multiple flows of different types. For example, the flows may include IP flows and layer 2 switched VLAN flows.

The second key parameter is the egress aggregate flow identifier 453b. This parameter is a globally unique node- or router-wide flow identifier that is allocated and associated with every egress logical flow that is built on an aggregated interface. The second lookup identifies the traffic characteristics of that flow. In an example implementation, different flows can be assigned by different types of traffic parameters. One flow may be a higher priority flow than another flow. In preferred embodiments, the flows do not interfere with another flow. The way the different types of flows are identified may be through using this aggregate flow ID, and each may be given a certain type of treatment.

The third key parameter is a miscellaneous key parameter 453c. This key parameter may provide additional information that is specific to the flow type 453a and the egress aggregate flow identifier 453b. The miscellaneous key parameter 453c is used to make a more qualified decision as to which Output Connection Identifier (OCID) to choose. For example, if an ingress LSP is built on an aggregated IP interface and a Virtual Private LAN Service (VPLS) Destination MAC (DMAC) forwarding decision is made that returns the egress aggregate flow identifier of that LSP, then the second CAM lookup (i.e., the aggregate CAM lookup) may also need to take into account the VPLS instance identifier in order to obtain the final OCID to be used for that LSP. In this embodiment, however, the miscellaneous key parameter 453c is not used.

The last key parameter is the hash value 453d, which is calculated based on the source and destination MAC addresses of the flow 409.

After the packet processor 430 builds the second key 423, it launches a second CAM lookup by providing the second key 423 to the CAM 435. The CAM 435 searches a second lookup table 439 for a key matching the second key 423 and provides an address or first index 441 used to index the Result SRAM 437. The contents of the Result SRAM 437 at the first index 441 is a first result 443 which may include an egress port member identifier. The egress port member identifier may include, for multiple egress line cards (433), a destination egress line card identifier identifying the egress line card to which to forward the flow 409, and an OCID identifying the port member of the egress line card to which to forward the flow 409. The packet processor 430 then forwards the flow 409 to the appropriate egress port member (e.g., a port member identified by hash value "x1") via the switch fabric 440.

In other words, a first lookup operation involves mapping an incoming flow that arrives on an incoming interface to an outgoing aggregated flow identifier. In other embodiments, the first lookup operation may involve mapping an {interface, flow} tuple to the outgoing aggregated flow identifier. A second lookup operation involves mapping the outgoing aggregated flow identifier to an outgoing link member of the aggregated group. In this embodiment, the outgoing aggregate flow identifier links the first lookup operation to the second lookup operation.

As described above, example embodiments of the present invention re-organize the keys in the CAM so that the first lookup is independent of the hash value. It is the use of the hash value that requires a significant number of CAM entries because each VLAN, for example, needs CAM entries corresponding to every possible hash value. The possible hash values come up in the second lookup. The number of CAM entries required by example embodiments is equal to about the number of ingress flows supported by an ingress interface plus the number of members of the aggregated group associated with the egress interface. For example, if 4,000 VLANs come in on the same ingress interface and they are destined to the same egress aggregated interface which has two members (e.g., two ports of an aggregated group), then the ingress interface needs 4,000+2=4,002 CAM entries. In comparison, for the single lookup embodiment (e.g., FIG. 3), the ingress interface needs 4,000×2=8000 CAM entries.

A switch may have multiple egress interfaces, each of which is aggregated and has eight members. In this case, the ingress interface of the double lookup embodiment (e.g., FIG. 4) needs 4,000+8=4,008 CAM entries, whereas the ingress interface of the single lookup embodiment uses 4,000×8=32, 000 CAM entries. Thus, a primary advantage of the double lookup embodiment is scalability. That is, fewer CAM entries are used for a greater number of flows. However, the number of CAM entries is reduced at the expense of having to do one more look up.

A switch is typically designed to minimize latency. If there is too much latency, packets take longer to get through the switch, and packets need to be buffered for a greater length of time. Embodiments of the present invention increase latency by performing two successive lookups instead of increasing the number of CAMs entries. Adding CAM to a switch may increase the latency by a given number of clock cycles, but performing a second lookup may increase latency, for example, by half the given number of clock cycles.

In a multi-service switch, increasing latency is better than increasing the number of CAM entries because a larger number of new packets of different services may be supported. For example, switching or routing devices employing embodiments of the present invention may support frame relay services, ATM services, Ethernet, GigaEthernet (GigE), IP, IPv6, MPLS, VLAN. These services, whether they involve switching or routing, each require CAM resources in order to perform the forwarding function.

Link aggregation is often implemented in pure layer 2 Ethernet switches. In this case, there is no concern about using up CAM resources. In fact, the switch may not use a CAM. For example, the switch may use a different data structure that is optimized strictly for layer 2 Ethernet. But, a CAM is the most flexible hardware today in a switch or router that supports multiple service types.

Many CAMs only support serial lookups. For example, in a system with four CAMs, a lookup operation involves searching each of the four CAMs one at a time until there is a match. However, a CAM may be designed to support parallel lookups in order to decrease the latency introduced by embodiments of the present invention. Thus, the first and second lookups involve performing four parallel lookups in the four respective CAMs.

Other example flow types include port to port and IP. For port to port flows, the first key (or forwarding lookup key) includes a layer 2 flow identifier. The result of the first key lookup includes (i) an input connection identifier, (ii) an "aggregated" bit indicating that the egress interface associated with the ingress flow is aggregated, and (iii) the egress aggregate flow identifier. The second key (or aggregate lookup key) includes a port key type parameter that identifies the new aggregate lookup table as a hash lookup for aggregated interfaces. The result of the second key lookup includes the OCID and a destination egress line card identifier. The hash value for the second key is calculated from the source and destination MAC addresses of a given port to port flow.

For IP flows, the first key includes a VPN identifier and a destination IP address. The result of the first key lookup includes the "aggregated" bit and the egress aggregate flow identifier. The second key includes an IP destination key type parameter, the egress aggregate flow identifier, a miscellaneous key parameter, which may be a traffic class identifier, and the hash value. The result of the second key lookup includes the OCID and a destination egress line card identifier. The hash value for the second key is calculated from the source and destination IP addresses of a given IP flow.

Figure 5:
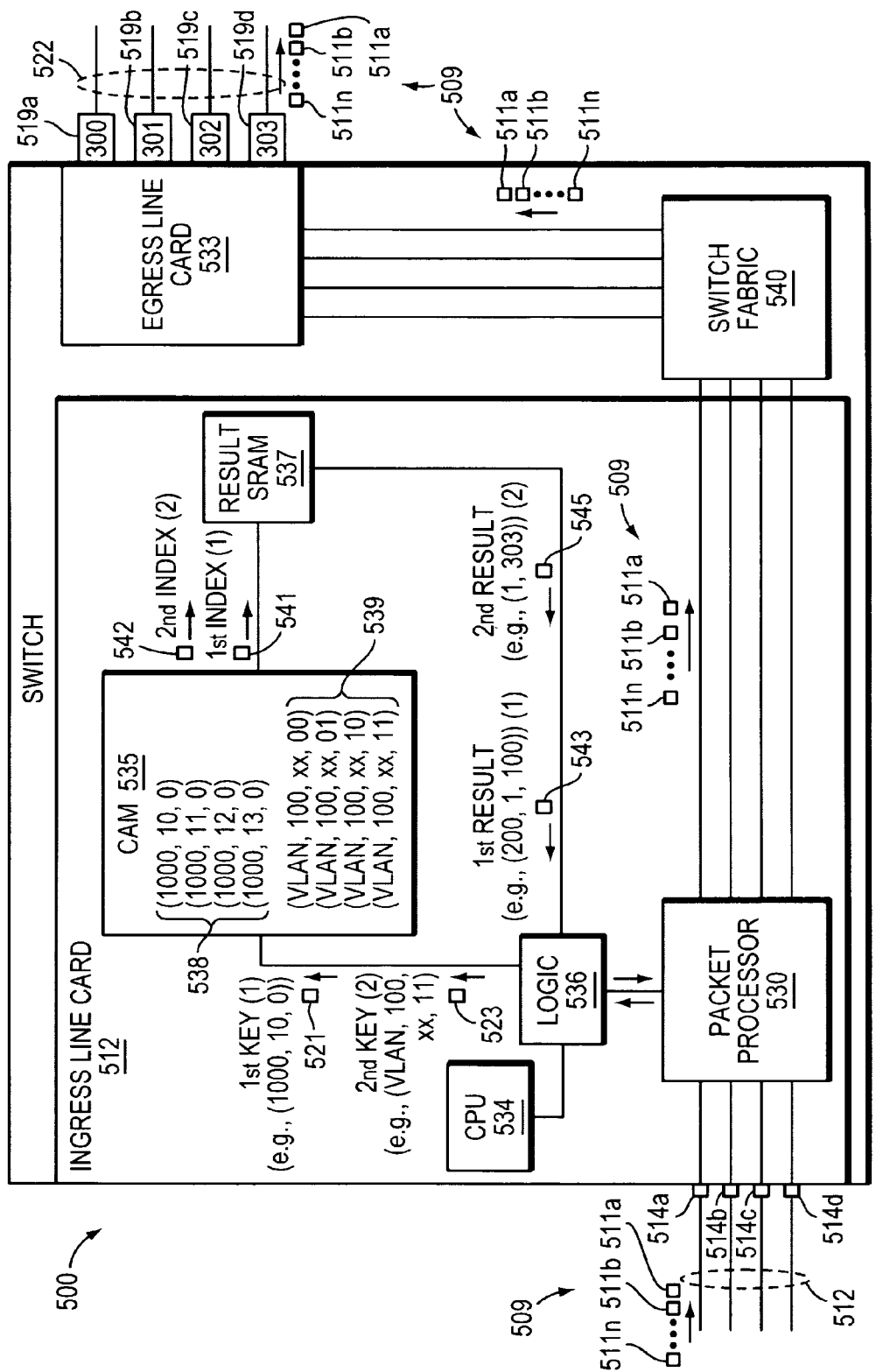

FIG. 5 is a block diagram of a switch 500 illustrating example components in an ingress line card 512 according to another embodiment of the present invention. In particular, FIG. 5 illustrates an embodiment of the invention that uses two successive lookups as applied to FIG. 3. A CAM 535 of FIG. 5 may include only eight CAM entries 538, 539 as compared to the sixteen CAM entries 338 in the CAM 535 of FIG. 3. Like the switch 310 in FIG. 3, the switch 500 includes an ingress line card 512, switch fabric 540, and an egress line card 533. The ingress line card 512 includes a packet processor 530, CPU 534, CAM 535, logic 536, and Result SRAM 537. The CAM 535 includes four entries in a first CAM lookup table 538 and four entries in a second CAM lookup table 539.

The packet processor 530 receives a flow 509, including multiple packets 511a, 511b, . . . , 511n, through ingress port 514a. The packet processor 530 then builds a first key 521 formatted to hit a CAM entry in the first CAM lookup table 538. The first key 521 includes three key parameters as described above with reference to FIG. 4. After the packet processor 530 builds the first key 521, it launches a first lookup by sending the first key 521 to the CAM 535. The CAM 535 searches the first lookup table 538 for a matching key (e.g., a first CAM entry for the first CAM lookup) and returns an address or first index 541 used to index the Result SRAM 537.

The information contained in an entry of the Result SRAM 537 located at the first index 541 is a first result 543 that includes an input connection identifier (ICID) (e.g., 200), an "aggregated" (e.g., 1) bit indicating that the packet processor 530 should launch a second CAM lookup, and the egress aggregate flow identifier (e.g., 100). The packet processor 530 then builds a second key 523 formatted to hit a CAM entry in the second lookup table 539. To build the second key 523, the packet processor 530 calculates a hash value (e.g., "11") based on the source and destination MAC addresses of the flow 509.

The second key 523 includes four key parameters as described above with reference to FIG. 4. After the packet processor 530 builds the second key 523, it launches a second lookup by sending the second key 523 to the CAM 535. The CAM 535 searches a second lookup table 539 for a matching key (e.g., a fourth CAM entry in the second CAM lookup table 539) and returns an address or second index 542 used to index the Result SRAM 537. The information contained in an entry of the Result SRAM 537 located at the second index 542 is a second result 545 that includes, for multiple egress line cards, a destination egress line card (e.g., 1) and an output connection identifier (OCID) (e.g., 303). The packet processor 530 then forwards the flow 509 to the appropriate egress port member (e.g., port member 519d (303) corresponding to hash value "11") via the switch fabric 540.

Figure 6:
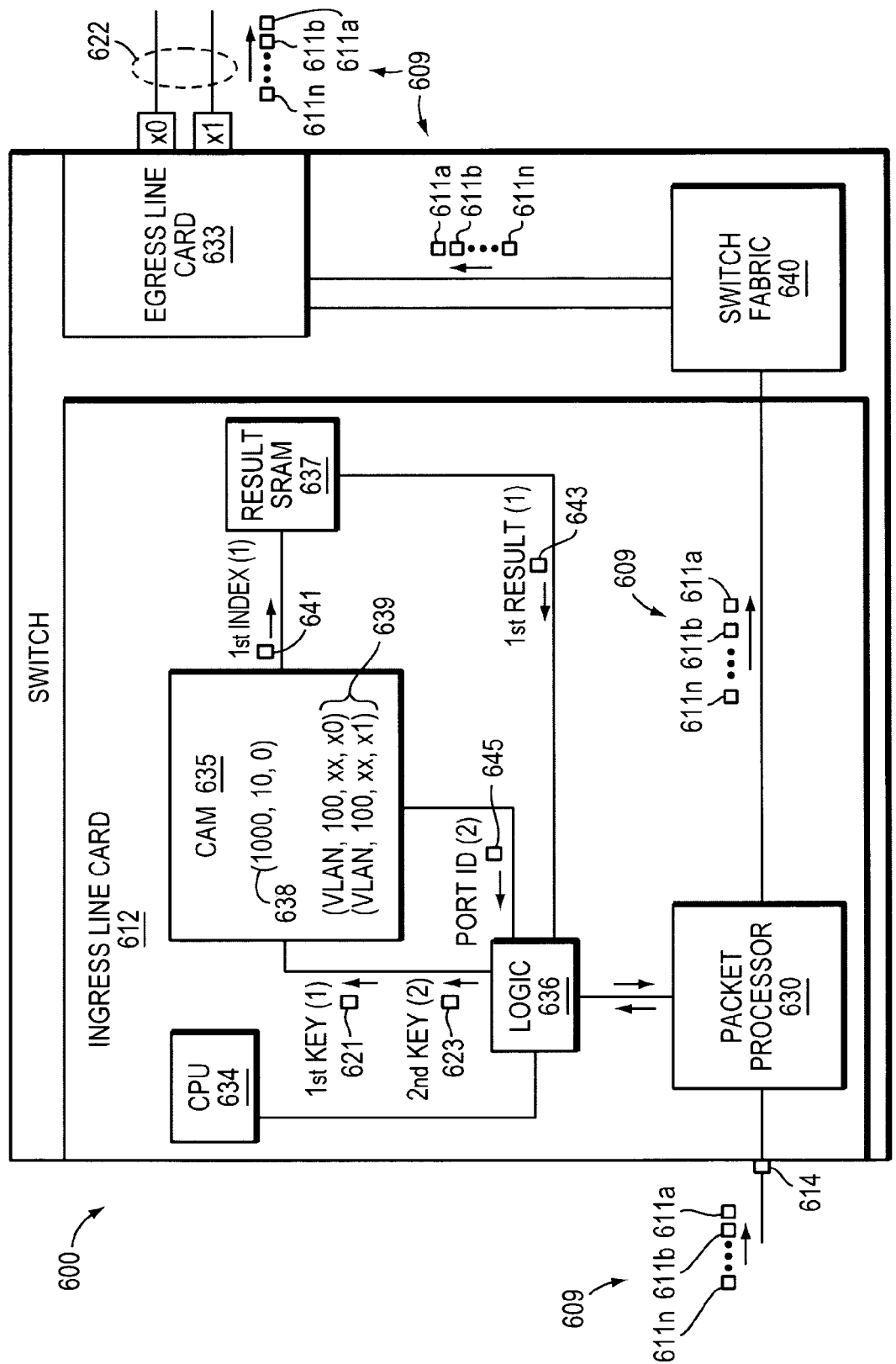

FIG. 6 is a block diagram of a switch 600 illustrating example components in an ingress line card 612 according to another embodiment of the present invention. Like the switch 400 in FIG. 4, the switch 600 includes an ingress line card 612, switch fabric 640, and egress line card 633. The ingress line card 612 includes a packet processor 630, CPU 634, CAM 635, logic 636, and Result SRAM 637. The CAM 635 includes one entry in a first CAM lookup table 638 and two entries in a second CAM lookup table 639.

The packet processor 630 receives a flow 609, including multiple packets 611a, 611b, ..., 611n, through a single ingress port 614. The packet processor 630 then builds a first key 621 formatted to hit a CAM entry in the first CAM lookup table 638. The first key 621 includes three key parameters as described above in reference to FIG. 4. After the packet processor 630 builds the first key 621, it launches a first lookup by sending the first key 621 to the CAM 635. The CAM 635 searches the first lookup table 638 for a matching key (e.g., a first CAM entry in the first CAM lookup table 638) and returns an address or first index 641 used to index the Result SRAM 637. The information contained in an entry of the Result SRAM 637 located at the first index 641 is a first result 643. The packet processor 630 then builds a second key 623 based on the first result 643 and formatted to hit a CAM entry for the second lookup 639. To build the second key 623, the packet processor 630 calculates a hash value (e.g., "x1") based on the source and destination MAC addresses of the flow 609.

The second key 623 includes four key parameters as described above in reference to FIG. 4. After the packet processor 630 builds the second key 623, it launches a second lookup by sending the second key 623 to the CAM 635. The CAM 635 then searches a second lookup table 639 for a matching key (e.g., a second CAM entry in the second CAM lookup table 639). In this embodiment, the result 645 of the second lookup corresponds directly to a port ID because the index value returned by the CAM 635 self-identifies the port ID due to predetermined placement of data in the CAM 635. Thus, when the matching key is found, the CAM 635 returns an egress port identifier 645, so there is no need in this embodiment to pass the second index (i.e., port ID 645) through the Result SRAM 637. An advantage of this embodiment is decreased latency because the Result SRAM 637 is indexed once instead of twice. Moreover, less result SRAM 637 space is used because Result SRAM entries corresponding to the entries in the second CAM lookup table 639 are eliminated. The packet processor 630 then forwards the flow 609 to the appropriate egress port member (e.g., the port member identified by hash value "x1") via switch fabric 640.

Figure 7:
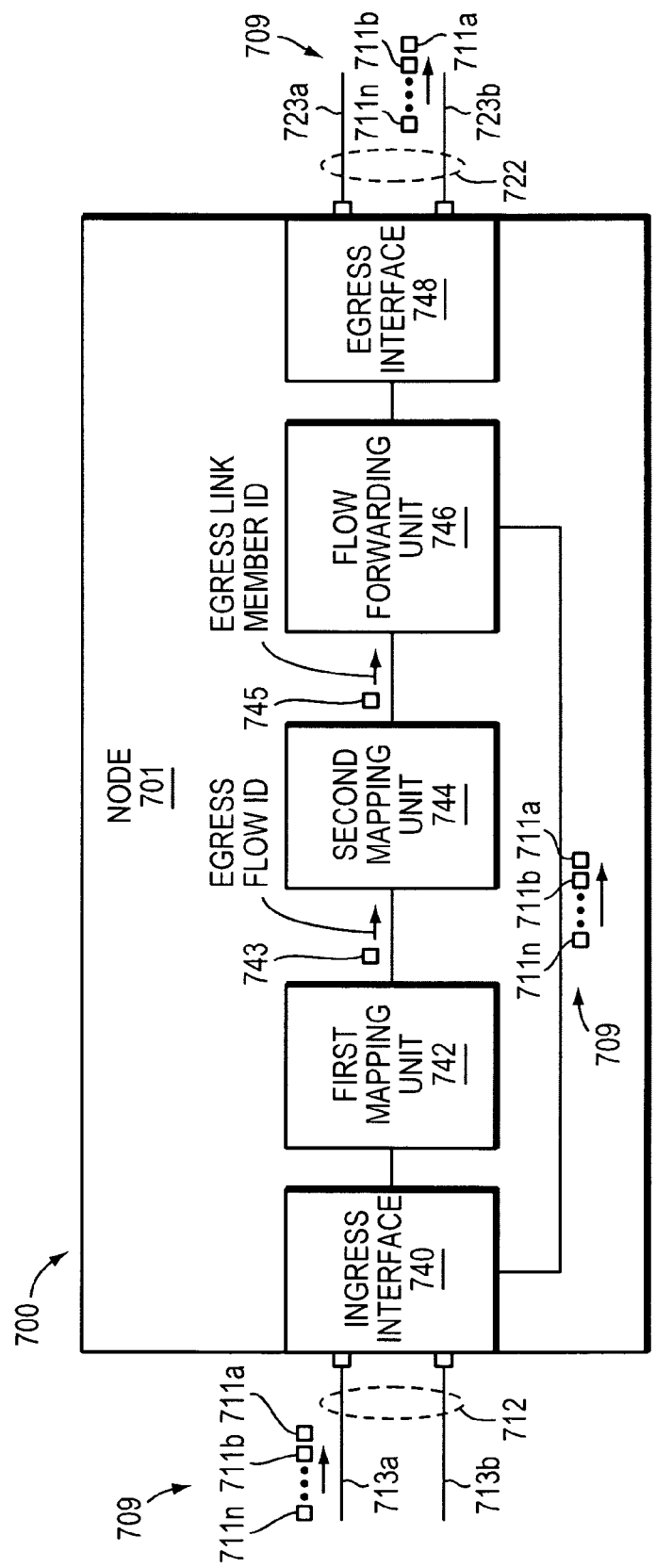
FIGS. 7-8 are block diagrams illustrating example components in a node of a communications network according to embodiments of the present invention.

FIG. 7 is a block diagram illustrating example components of a node 701 in a communications network 700 according to one embodiment. The node 701 includes an ingress interface 740 that receives a given ingress flow 709, which may include multiple packets 711a, 711b, ..., 711n, on a first ingress link 713a. The first ingress link 713a may be a member of a link aggregation group 712, which also includes a second ingress link 713b. A first mapping unit 742 maps the given ingress flow 709 to an egress flow identifier 743. A second mapping unit 744, in turn, maps the egress flow identifier 743 to an egress link member identifier 745 based on information available in the given ingress flow 709. The egress link member identifier 745 identifies an egress link (e.g., a first egress link 723a or a second egress link 723b) to which to forward the given ingress flow 709. The egress links 723a-b may be members of an aggregated group 722 associated with an egress interface 748. A flow forwarding unit 746 then forwards the given ingress flow 709 to the egress link member corresponding to the egress link member identifier 745 (e.g., the second egress link member 723b).

Figure 8:
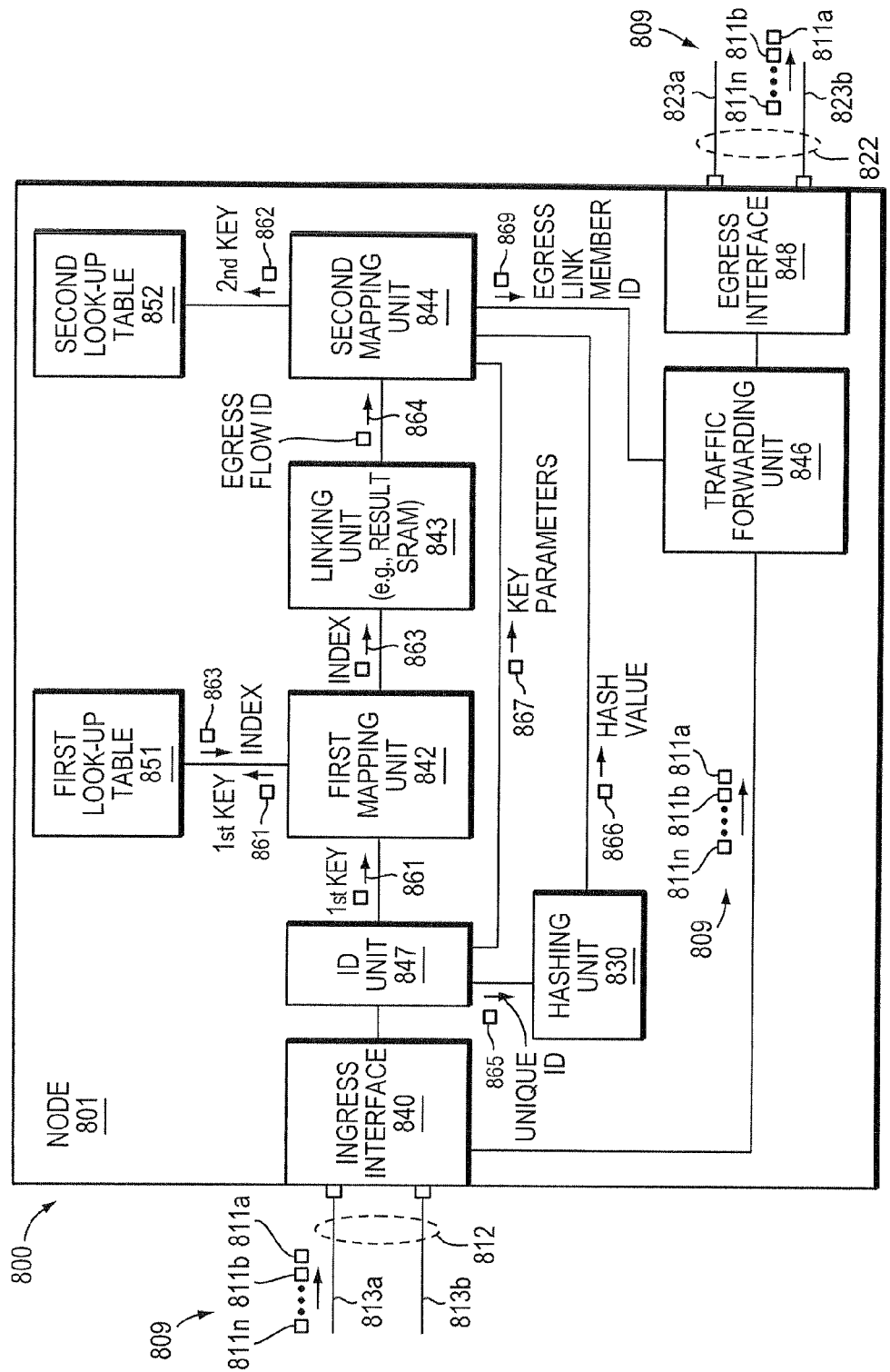

FIG. 8 is a block diagram illustrating example components of a node 801 in a communications network 800 according to another embodiment. The node 801 includes an ingress interface 840 that receives a given ingress flow 809, which may include multiple packets 811a, 811b, ..., 811n, on a first ingress link 813a. The first ingress link 813a may be a member of a link aggregation group 812, which also includes a second ingress link 813b. The node 801 includes an identification unit 847 that identifies parameters associated with the given ingress flow 809 to include in a first key 861 and a second key 862.

After the identification unit 847 or a first mapping unit 842 builds the first key 861, the first mapping unit 842 searches a first lookup table 851 for a match of the first key 861. A linking unit 843 then links the search of the first lookup table 851 to a search of a second lookup table 852. For example, the linking unit 843 may receive an index value 863 from the first lookup table 581 and provide part of the second key 862, such as an egress flow identifier 864, to a second mapping unit 844. The linking unit 843 may include Static Random Access Memory (SRAM) having an entry addressed by the index value 863. The entry may include the egress flow identifier 864. In this manner, the given ingress flow 809 is mapped to the egress flow identifier 864.

The node 801 may also include a hashing unit 830 that hashes or calculates a hash value 866 based on a unique identifier 865 available in the given ingress flow 809. The unique identifier 865 may include source and destination Media Access Control (MAC) addresses or source and destination Internet Protocol (IP) addresses. The second mapping unit 844 may build the second key 862 using the result 866 of the hashing unit 830, the result 866 of the linking unit 843, and other key parameters 867 identified by the identification unit 847. The second mapping unit 844 may then search the second lookup table 852 for a match of the second key 862.

When the second mapping unit 844 finds a match, it may provide an egress link member identifier 869 corresponding to the match to the traffic forwarding unit 846. In this manner, the second mapping unit 844 may map the egress flow identifier 864 to the egress link member identifier 869. The egress link member identifier 869 identifies an egress link (e.g., a first egress link 823a or a second egress link 823b) to which to forward the given ingress flow 809. The egress links 823a-b may be members of an aggregated group 822 associated with an egress interface 848. The traffic forwarding unit 846 then forwards the given ingress flow 809 to the egress link member corresponding to the egress link member identifier 869 (e.g., the second egress link member 823b).

Figure 9:
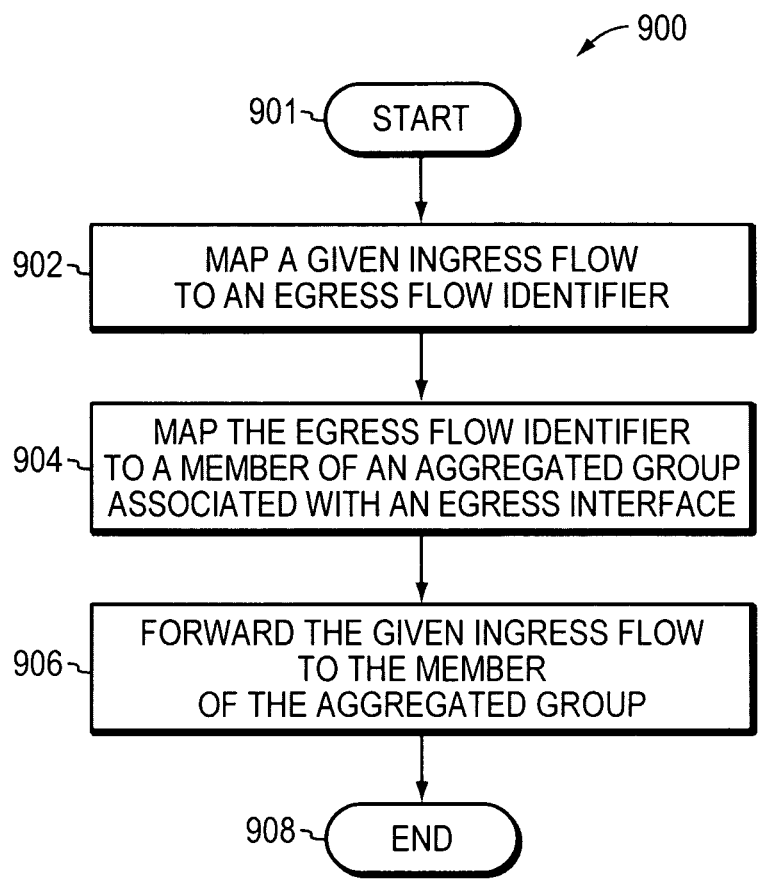
FIGS. 9-11 are example flow diagrams performed by elements of a communications system according to embodiments of the present invention.

FIG. 9 is an example flow diagram 900 performed by elements of a communications system according to an embodiment of the present invention. After starting (901), a network node maps an ingress interface to an egress flow identifier (902). The network node then maps the egress flow identifier to a member of an aggregated group associated with an egress interface based on information available in a given ingress flow (904). Finally, the network node forwards a given ingress flow to a member of the aggregated group associated with the egress interface (906) and ends the above process (908).

Figure 10:
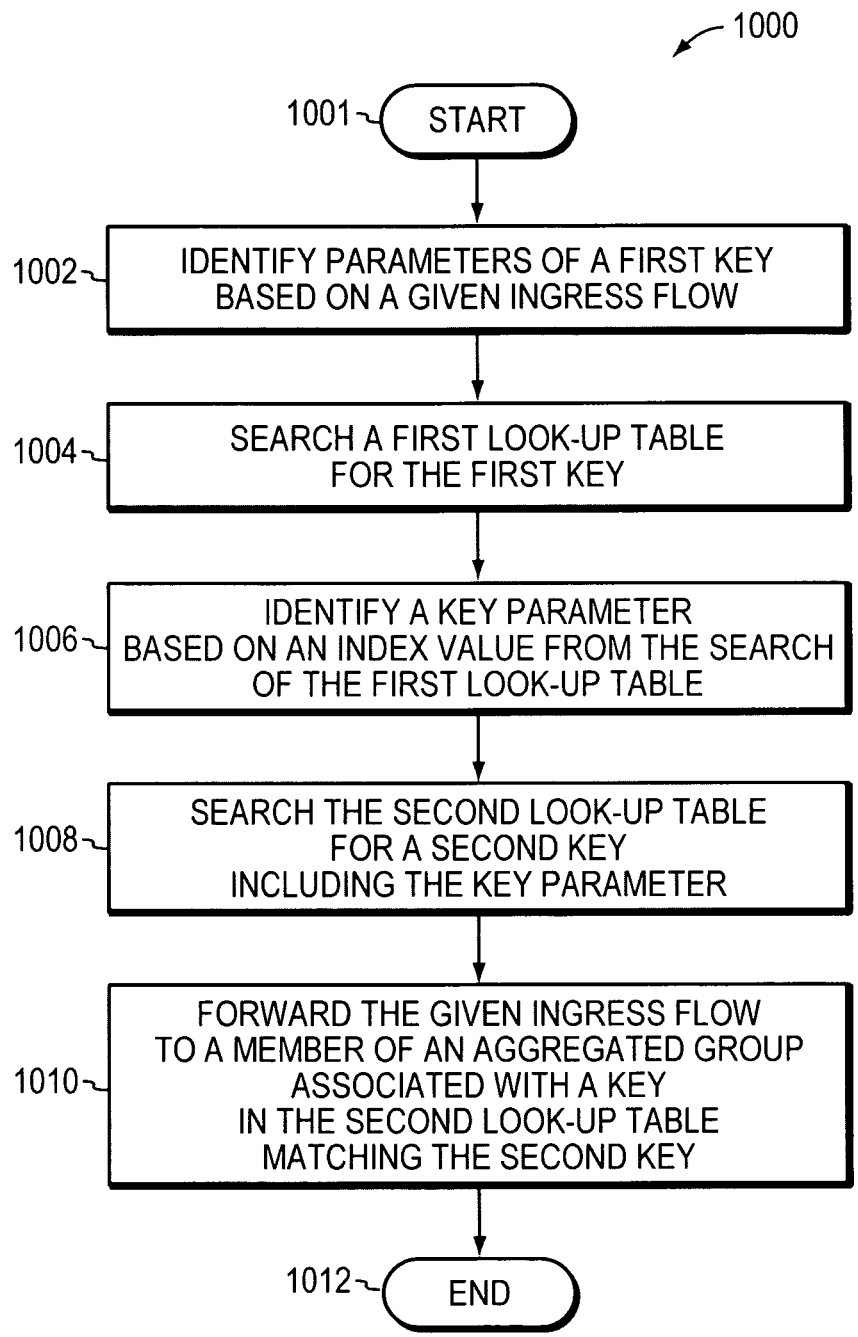

FIG. 10 is another example flow diagram performed by elements of the communications system. After starting (1001), parameters of a first key are identified for a given ingress flow (1002). A first look-up table is searched to find a match for the first key (1004). A key parameter is identified based on an index value from the search of the first look-up table (1006). Next, the second look-up table is searched to find a second key that includes the key parameter (1008). The given ingress flow is forwarded to a member of an aggregated group associated with a key in the second look-up table matching the second key (1010). The above process 1000 then ends 1012.

Figure 11:
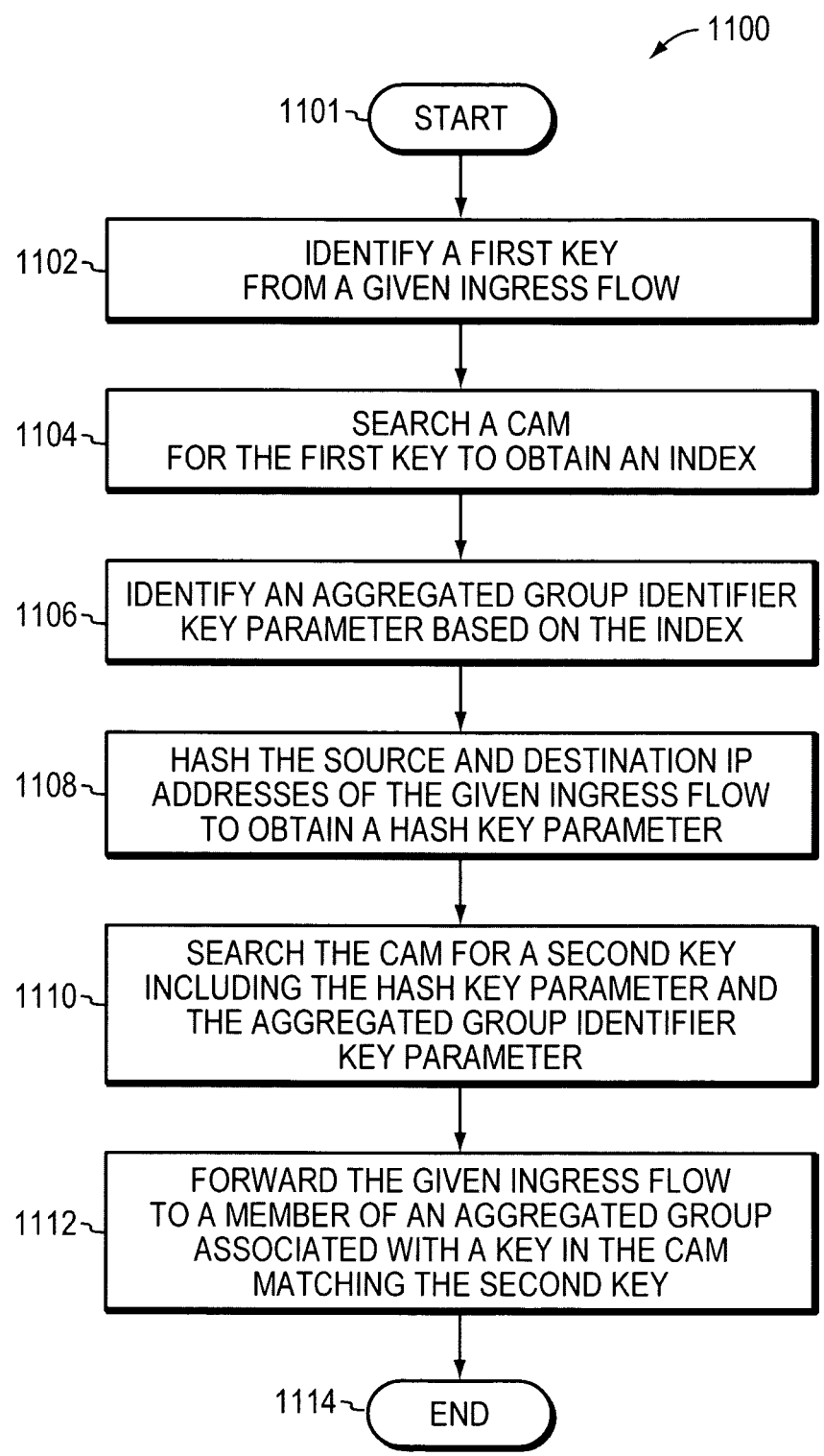

FIG. 11 is an example flow diagram performed by elements of a communications system 1100. After starting (1101), a first key is identified from a given ingress flow (1102). A CAM is searched to find a match for the first key and to obtain an index corresponding to the matching key (1104). An aggregated group identifier is obtained based on the index (1106). The source and destination IP addresses of the given ingress flow are hashed to obtain a hash key parameter (1108). Next, the CAM is searched to find a match for a second key including the hash key parameter and the aggregated group identifier (1110). Finally, the given ingress flow is forwarded to a member of an aggregated group associated with a key in the CAM matching the second entry (1112). The above process 1100 then ends (1114).

While this invention has been particularly shown and described with references to example embodiments thereof, it will be understood by those skilled in the art that various changes in form and details may be made therein without departing from the scope of the invention encompassed by the appended claims.

The term "about" allows for any differences that are within the spirit and scope of the inventions described in the present specification.

It should be understood that the forwarding logic (i.e., packet processor, CAM, and so forth) may be implemented in a line card, a motherboard (containing the forwarding and switching logic on the same printed circuit board (PCB), or any other medium known to a person having ordinary skill in the art.

What is claimed is:

1. A method of performing link aggregation in a network node, comprising:
    mapping a given ingress flow to an egress flow identifier by searching for a match of a first key in a first lookup table and providing a result;
    mapping the egress flow identifier to a member of an aggregated group associated with an egress interface of the network node based on information available in the given ingress flow using a globally-unique, node-wide, aggregate flow identifier by searching for a match of a second key in a second lookup table, the second key including at least part of the result; and
    forwarding the given ingress flow, via the egress interface, to the member of the aggregated group associated with the egress interface;
    wherein the number of entries in the first and second lookup tables combined is based on the number of ingress flows supported by an ingress interface plus the number of members of the aggregated group associated with the egress interface.

2. The method according to claim 1 wherein mapping the egress flow identifier includes hashing a unique identifier available in the given ingress flow and using a result of the hashing in determining the member of the aggregated group.

3. The method according to claim 2 wherein the unique identifier includes source and destination Media Access Control (MAC) addresses or source and destination Internet Protocol (IP) addresses.

4. The method according to claim 1 wherein searching for a match of the first key results in an index value and mapping the given ingress flow further includes identifying the egress flow identifier based on the index value.

5. The method according to claim 1 wherein searching for a match of the second key results in an index value and mapping the egress flow identifier further includes identifying the member of the aggregated group associated with the egress interface based on the index value.

6. The method according to claim 1 further comprising identifying at least one parameter of the first key or the second key, the parameter being associated with the given ingress flow.

7. The method according to claim 1 wherein the number of entries in the first and second lookup tables combined is equal to the number of ingress flows supported by an ingress interface plus the number of members of the aggregated group associated with the egress interface.

8. The method according to claim 1 wherein searching the first and second lookup tables includes accessing Content Addressable Memory (CAM).

9. The method of claim 1, further comprising:
    building the first key based on the given ingress flow; and
    building the second key based on at least one of a hash value calculated from the given ingress flow, the egress flow identifier, and other key parameters.

10. The method of claim 9, further comprising calculating the hash value based on at least one of a source Media Access Control (MAC) address, destination MAC address, source Internet Protocol (IP) address, and destination IP address of the given ingress flow.

11. A network node, comprising:
    a first mapping unit configured to map a given ingress flow to an egress flow identifier by searching a first lookup table for a match of a first key and providing a result;
    a second mapping unit configured to map the egress flow identifier to a member of an aggregated group associated with an egress interface of the network node based on information available in the given ingress flow using a globally-unique, node-wide, aggregate flow identifier by searching a second lookup table for a match of a second key, the second key including at least part of the result; and
    a flow forwarding unit configured to forward the given ingress flow, via the egress interface, to the member of the aggregated group associated with the egress interface;
    wherein the number of entries in the first and second lookup tables combined is based on the number of ingress flows supported by an ingress interface plus the number of members of the aggregated group associated with the egress interface.

12. The node according to claim 11 further comprising a hashing unit configured to hash a unique identifier available in the given ingress flow, wherein the second mapping unit uses the result of the hashing unit to determine the member of the aggregated group.

13. The node according to claim 12 wherein the unique identifier includes source and destination Media Access Control (MAC) addresses or source and destination Internet Protocol (IP) addresses.

14. The node according to claim 11, further comprising a linking unit configured to receive an index value from the first lookup table and provides at least part of the second key.

15. The node according to claim 14 wherein the linking unit is Static random Access Memory (SRAM) having entries addressed by the index value.

16. The node according to claim 11 further comprising an identification unit configured to identify at least one parameter of the first key or the second key, the parameter being associated with the given ingress flow.

17. The node according to claim 11 wherein the number of entries in the first and second lookup tables combined is equal to the number of ingress flows supported by an ingress interface plus the number of members of the aggregated group associated with the egress interface.

18. The node according to claim 11 wherein the first and second lookup tables are Content Addressable Memory (CAM).

19. A non-transitory computer-readable medium having stored thereon sequences of instructions, the sequences of instructions including instructions, when executed by a digital processor, that cause the processor to:
  map a given ingress flow to an egress flow identifier by searching for a match of a first key in a first lookup table and providing a result;
  map the egress flow identifier to a member of an aggregated group associated with an egress interface of a network node based on information available in the given ingress flow using a globally-unique, node-wide, aggregate flow identifier by searching for a match of a second key in a second lookup table, the second key including at least part of the result; and
  forward the given ingress flow, via the egress interface, to the member of the aggregated group associated with the egress interface;
  the number of entries in the first and second lookup tables combined is based on the number of ingress flows supported by an ingress interface plus the number of members of the aggregated group associated with the egress interface.

\* \* \* \* \*